(No Model.) 2 Sheets—Sheet 1.
J. H. COX.
HORSE HAY RAKE.
No. 492,145. Patented Feb. 21, 1893.
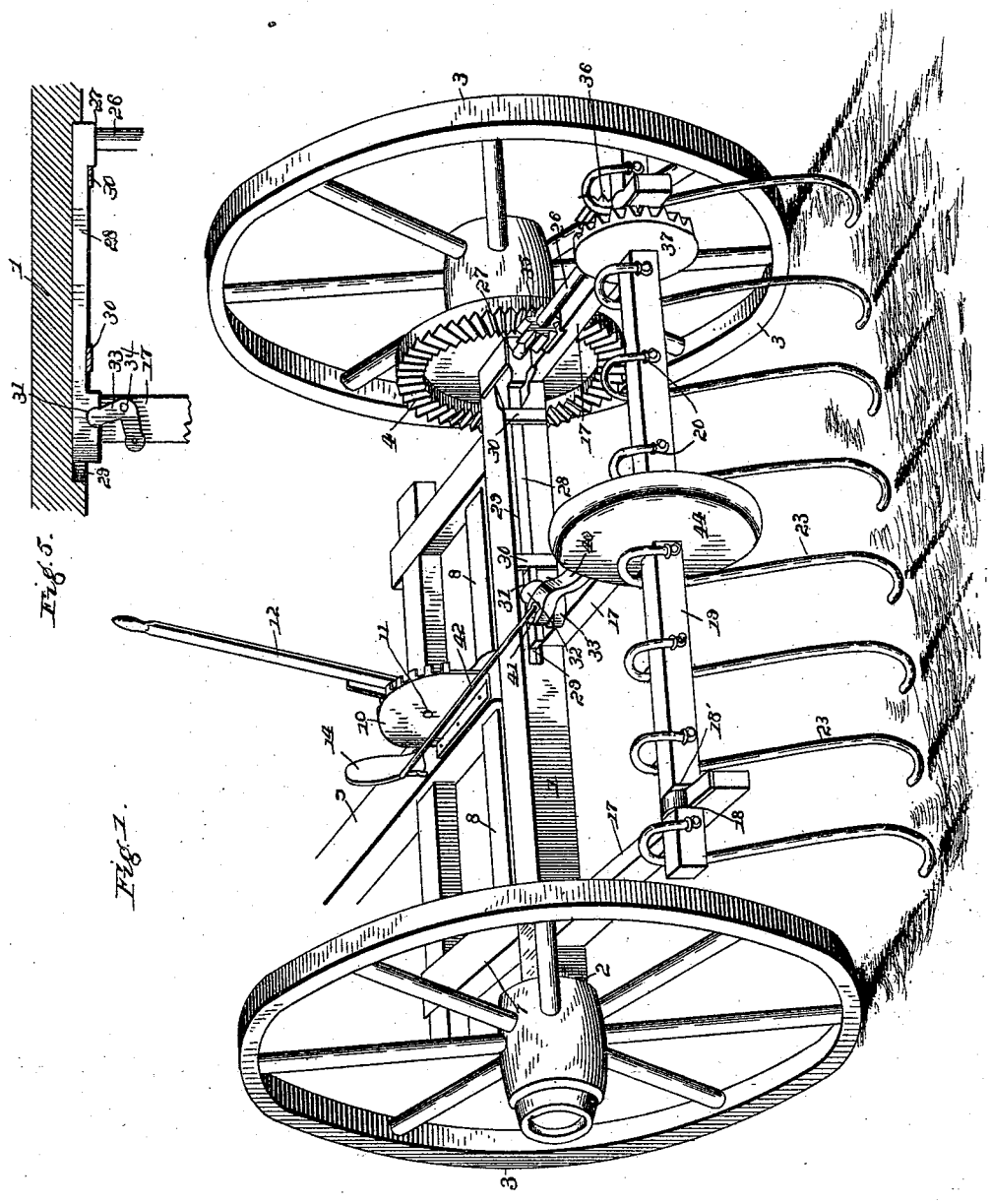
Witnesses
F. M. Johnson
John B. Diggers
Inventor
John H. Cox
By his Attorneys,
C. A. Snow & Co.
THE NORRIS PETERS CO., PHOTO-LITHO., WASHINGTON, D. C.

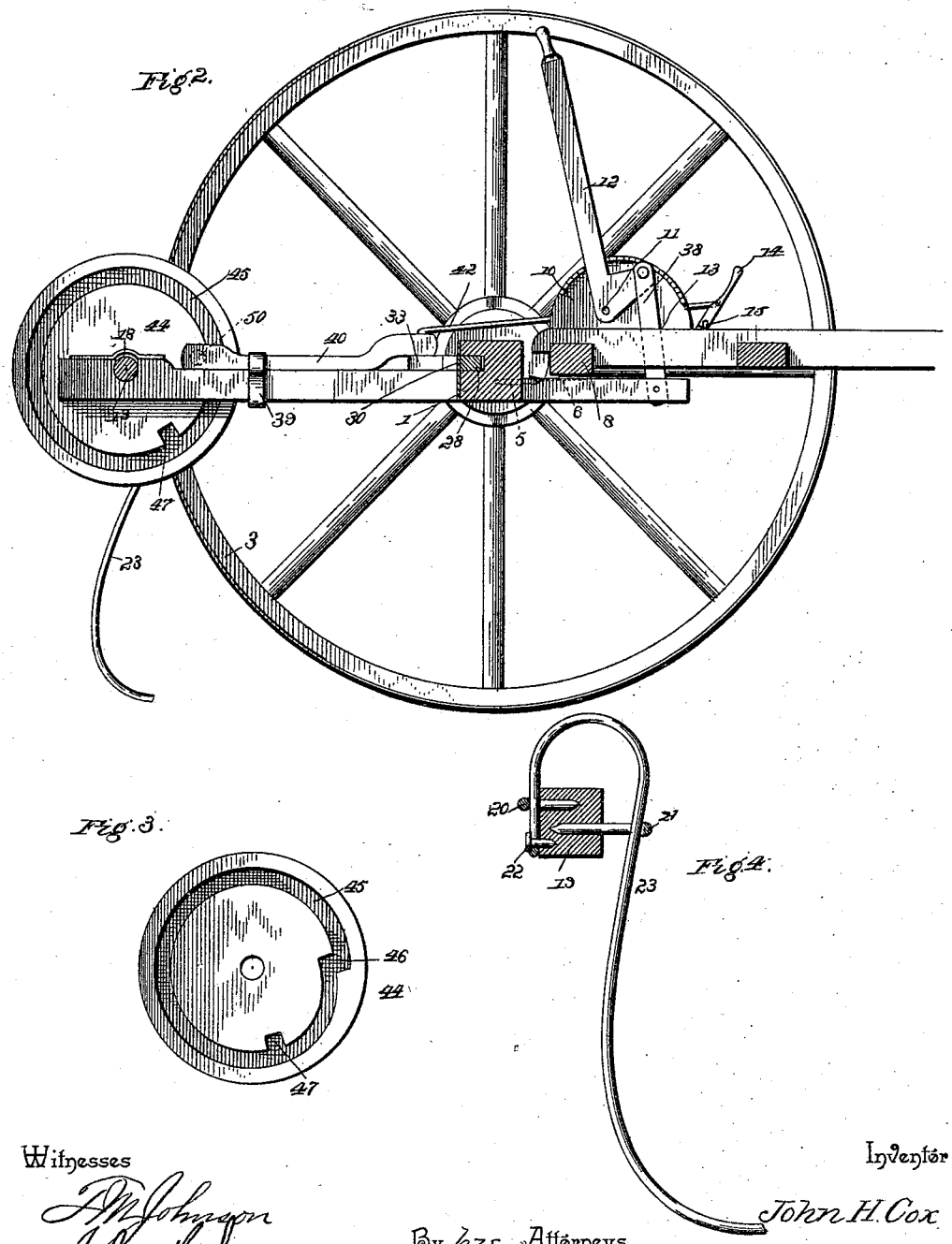

UNITED STATES PATENT OFFICE.

JOHN H. COX, OF HOWARD, KANSAS.

HORSE HAY-RAKE.

SPECIFICATION forming part of Letters Patent No. 492,145, dated February 21, 1893.

Application filed July 16, 1892. Serial No. 440,241. (No model.)

*To all whom it may concern:*

Be it known that I, JOHN H. COX, a citizen of the United States, residing at Howard, in the county of Elk and State of Kansas, have invented a new and useful Horse Hay-Rake, of which the following is a specification.

My invention relates to improvements in horse hay rakes, the objects in view being to provide a cheap and simple construction of rake the teeth of which may be regulated or vertically adjusted to suit horses of different heights and to provide means for automatically locking the rake against dumping, and means for releasing the rake and dumping the same, motion being communicated to the rake by that of the machine.

Other objects and advantages of the invention will appear in the following description, and the novel features thereof will be particularly pointed out in the claims.

Referring to the drawings: Figure 1 is a perspective view of a horse hay rake embodying my invention. Fig. 2 is a vertical longitudinal section of the same. Fig. 3 is a detail in elevation of the cam-disk. Fig. 4 is an enlarged transverse section through the rake-head and one of the rake-tooth fastenings. Fig. 5 is a horizontal sectional view of a portion of the axle and the shifting mechanism adjacent thereto.

Like numerals of reference indicate like parts in all the figures of the drawings.

In practicing my invention I employ a transverse axle 1, which is square in cross-section with the exception of its ends which are reduced to form bearing-spindles 2, that receive, rotatably, the usual ground-wheels 3, the hub of one of which in this instance is provided at its inner end with a toothed beveled master-gear 4. Staples 5 project from the front face of the axle, near the ends thereof, and are connected loosely with hooks 6, that are located upon the under sides and at the rear ends of a pair of short longitudinally-disposed bars 7. These bars have let into the same transverse connecting-bars 8, a pair of which is employed; and they in turn are let into and have let into themselves a central draft-pole 9, of ordinary construction. A curved toothed locking-standard 10, is secured upon the upper side and at the rear end of the tongue 9, and pivoted concentric therewith at 11 is a bell-cranked hand-lever 12, the lower short branch of which is directly above a narrow slot 13 formed in the draft-pole 9, near the rear end of the latter. A foot-lever 14 is pivoted at 15 at its lower end to the pole immediately in advance and slightly to one side of the toothed locking-standard 10, and said foot-lever 14 and the hand-lever 12 are always in easy reach of the operator who is perched upon the seat especially provided for his accommodation.

Extending rearward from the axle is a series of three bars 17, each of which is rigidly secured to the axle and is provided near its rear end and upon its upper side with a bearing 18. The bearings are in transverse alignment and accommodate and receive the reduced bearing-portions 18', with which the rake-bar 19 is, at intervals, provided, whereby the rake-bar, as will be obvious, is capable of rotating within the bearings 18. At intervals the rear side of the rake-bar is provided with staples 20, and similar though longer staples 21 project from the front face of the rake-bar directly opposite the staples 20. Below the staples 20 headed studs or pins 22 project from the rake-bar, so that, as will be obvious, the staples 20, 21, and studs 22 all align. 23 designates the spring rake-teeth which, in number, agree with the staples and studs. The rake-teeth are curved at their lower ends as is usual, are bent upon themselves at their upper ends, so that they are of inverted U-85 shape, have their front terminals loosely embraced by the elongated staples 21, their rear terminals snugly embraced by the staples 20, and finally, at their upper rear extremities, terminate in eyes 24, which, as shown, engage with the headed studs 22 before mentioned. Thus are the teeth secured to the rake-bar and in addition to their own or inherent resiliency, the manner of connection employed adds to the same, rendering them flexible and capable of great bending and deviation from their normal state before breaking. Their efficiency and durability are thereby increased, as will be obvious.

Upon the outer bar 17, at the right of the machine, near its bearing 18, a bearing 25 is located, and in the same there is somewhat loosely journaled and capable of a slight vibratory movement a short longitudinal shaft 26, the front end of which is journaled in a bearing 27, formed in the outer end of a sliding bar 28, which latter is located in a longitudinal groove 29, formed in the rear face of the axle and in which the bar 28 is designed to slide. The bar is maintained in position through the medium of keepers or overlapping plates 30, secured to the axle. At its inner end the bar 28 is provided with a nearly circular notch 31, and the same engages with the rounded head 32, formed at one end of a bell-crank lever 33, which is pivoted at 34 at its angle upon the central bar 17. By vibrating this bell-crank lever it will be obvious that a longitudinal movement will be imparted to the sliding bar 28. A small pinion 35 is formed on the shaft 26, near the front end of the latter, and by the movements of the bar 28 may be thrown into and out of operative engagement with the master-gear 14. A similar pinion 36 is located on the rear end of the shaft 26, and the same engages with the teeth of a gear 37, somewhat larger than the pinion 36, and mounted on the rake-head or bar 19.

The central bar 17 has its front end extended beyond its companions, and consequently terminates in advance of the axle 1, and is loosely connected to the shorter branch of the bell-crank hand-lever 12, by means of a link 38 which passes down through the opening 13 in the draft-pole. A clip 39 is mounted upon the bar 17 near its rear end, and in it and upon the bar there is mounted for sliding a locking bar 40, the front end of which is pivoted at 41 to the disengaged end of the bell-crank lever, and by means of a rod 42 is connected with the foot-lever 14, by means of which the bar 40 is reciprocated and hence, in a manner as will be obvious, the bell-crank lever vibrated to throw the gear 35 into and out of engagement with the master-gear 4, whereby the rake-head or bar 19 may remain stationary or rapidly rotated, as may be desired.

Upon the rake-bar or head 19 there is mounted, near the center of the same or at one side of the center bar 17, a disk 44, whose face is provided at one side with an annular groove 45. This groove 45 at two points is provided with offsets 46 and 47, the one for locking the rake-head in such position that the teeth will be in operative position, and the other for locking the teeth out of such operative position or elevated between the bars 17. A pin 50, extending from the rear side of the bar 40, engages with the offsets and annular groove.

This completes the construction of the machine, whose operation will be obvious from such description, though I will briefly describe the same. Taking the rake-teeth in their elevated or inoperative position, in which the pin of the bar 40 engages with the offset 47, the driver, by depressing the foot-lever 14 with his foot, withdraws the pin from engagement with the offset, and by the same movement the oscillation of the bell-crank lever is effected, so that the bar 28 is slid outward and the machine thrown into gear in a manner hereinbefore described. Such movement causes the rake bar or head to partially rotate, lowering the teeth to the ground. As the rake is dragged along and the hay accumulates, and it is desired to dump the same, the foot-lever is again pressed by the operator, which withdraws the pin from the offset 46, and once more throws the gears into connection, so that the rake-bar is rotated completely and by reason of the inclined wall with which the offset is provided, an automatic engagement is made. In this manner the wind-rows are at intervals provided. When leaving the scene of operation, the foot-lever is pressed and the team driven slowly until the pin engages with the offset 47, whereby the rake-head becomes once more locked and the teeth are elevated to substantially a horizontal position whereby they are out of danger of engagement with any obstructions that may lie in the path.

Having described my invention, what I claim is—

1. In a horse hay rake, the combination with the framework, axle, ground-wheels, and master-gear secured to one of the latter, of a series of rearwardly-disposed bars having bearings at their rear ends, a tooth-carrying rake-head journaled in the bearings, a gear on the rake-head, a shaft journaled and capable of oscillation upon one of the bars and provided at its front and rear ends with pinions adapted to engage the gear of the rake-head and the master-gear, a sliding-bar mounted for reciprocation in a recess formed in the axle and provided at its outer end with a bearing for the front end of said shaft, a bell-crank lever pivoted on one of the bars and having one branch loosely connected with the inner end of the sliding bar, a sliding-rod mounted on the central bar and having its front end pivotally connected to the remaining end of the bell-crank, a pin extending from said rod, a pivoted foot-lever connected with the rod, a cam-disk provided at one side with an annular groove having the upper and lower offsets 46 and 47 and engaging the pin, said disk being mounted upon the rake-bar or head, substantially as specified.

2. The combination with the rake-bar having front and rear staples, the former being elongated, and the studs located below the latter, of a spring-tooth having its terminals passed through the staples and its rear terminals bent to form eyes for engaging the studs, substantially as specified.

3. In a horse hay-rake, the combination with the framework, axle, ground-wheels and master-gear, of a rear rotatable rake-head having rake-teeth, means for transmitting motion from the master-gear to the rake-head, a disk mounted on the rake-head and having in its face the groove 45, and at the inner edge thereof the shoulder 46 beveled at one side and the locking recess 47, the bar 40 mounted for sliding on the frame and having a pin 50 engaging the groove, and a lever for operating such sliding-bar, substantially as specified.

In testimony that I claim the foregoing as my own I have hereto affixed my signature in the presence of two witnesses.

JOHN H. COX.

Witnesses:
JOHN KAUTZMAN,
J. H. WEST.